United States Patent [19]

Krohn

[11] 4,277,270
[45] Jul. 7, 1981

[54] METHOD OF MANUFACTURE OF OPTICAL FIBER

[75] Inventor: David A. Krohn, Hamden, Conn.

[73] Assignee: Eotec Corporation, West Haven, Conn.

[21] Appl. No.: 53,764

[22] Filed: Jul. 2, 1979

Related U.S. Application Data

[63] Continuation-in-part of Ser. No. 898,840, Apr. 21, 1978, abandoned.

[51] Int. Cl.³ .............................................. C03C 25/02
[52] U.S. Cl. ......................................... 65/3 A; 65/13; 264/1.1; 350/96.31; 427/163
[58] Field of Search .................. 65/3 A, 13; 264/1; 427/163; 350/96.31

[56] References Cited

U.S. PATENT DOCUMENTS 3,941,474  3/1976  Kitano et al. ................... 65/30 E X

FOREIGN PATENT DOCUMENTS 1340849  6/1976  United Kingdom ...................... 65/3 A Primary Examiner—Robert L. Lindsay, Jr.
Attorney, Agent, or Firm—Darby & Darby

[57] ABSTRACT

A process is disclosed for manufacturing an optical fiber comprising a silica cladding and multi-component glass core wherein a tube made of the cladding material serves as a crucible in which the core glass is melted and fined. The core glass includes silicon dioxide, boron oxide, barium oxide or lead oxide (or a combination of both, and an alkali oxide). The materials are selected to provide a high numerical aperture, rapid melting and stability at the high temperatures required to draw the fiber. In accordance with a further feature of the invention, the batch material for the core is actually melted as it is falling to the bottom of the silica tube, thereby increasing the speed of melting and further facilitating outgassing of effluents.

5 Claims, 1 Drawing Figure

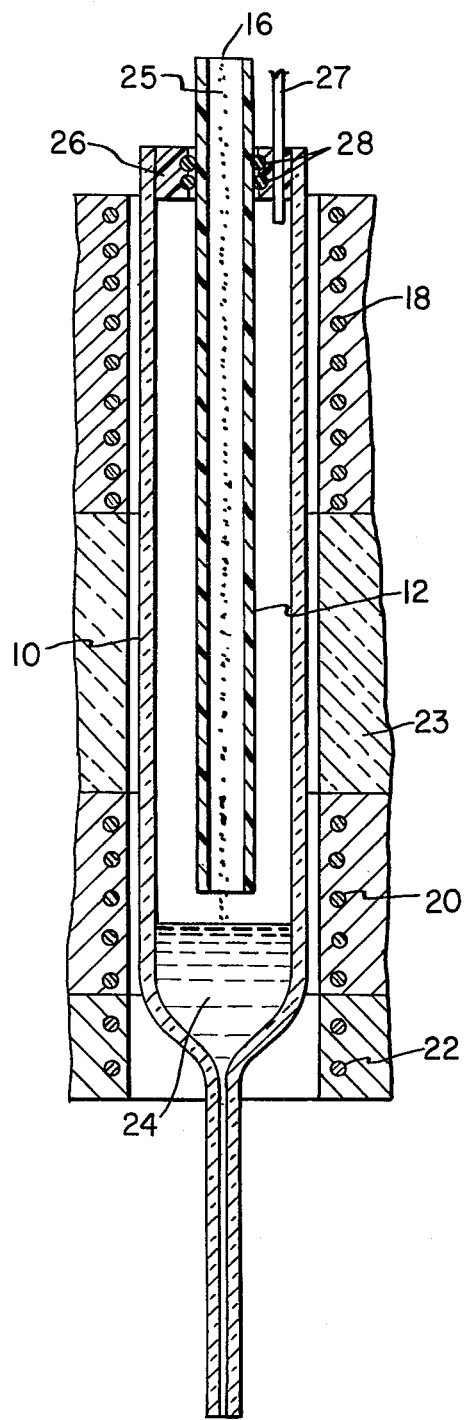

METHOD OF MANUFACTURE OF OPTICAL FIBER

This is a continuation-in-part of U.S. patent application Ser. No. 898,840 filed Apr. 21, 1978, and entitled "Method of Manufacturing Optical Fibers" now abandoned.

BACKGROUND OF THE INVENTION

This invention relates to optical fibers and to a method of manufacturing a low loss optical fiber having a high numerical aperture. More specifically, this invention relates to an optical fiber wherein the core glass material is melted and fined within a tube made of the cladding material.

Optical fibers (or optical waveguides as they are sometimes called) should have minimum transmission losses and, in many applications, the ability to gather or accept light from the widest possible angle. These properties enable the maximum transfer of energy by the fiber from a light source to an output device.

Known optical fibers comprise a glass core enveloped by a glass cladding layer having an index of refraction ($n_2$) less than the index of refraction of the core material ($n_1$). Simply stated, the difference between these indices causes light rays entering the fiber within a specified angle to be reflected internally and thereby transmitted through the fiber. The "cone" of light which can be accepted by a fiber is known as the angle of acceptance and the sine of this angle is referred to as the numerical aperture (NA) of the fiber. For any fiber:

$$NA = (n_1^2 - n_2^2)^{\frac{1}{2}}$$

The higher the numerical aperture, the greater the ability of the fiber to gather light. For numerical aperture equal to one, the angle of acceptance is 90° which means that all of the light striking the face of the fiber will be coupled into it.

Increasing the numerical aperture, while enhancing light gathering efficiency, introduces problems of dispersion because rays entering at grazing angles will travel longer paths than rays which are perpendicular to the face of the fiber. This means that different parts of a light pulse (for example) will traverse the fiber with different traversal times. As a result, the light pulse at the fiber output will be dispersed or boardened and this limits the data carrying capacity of the fiber.

To overcome this problem, the refractive index of the core may be graded so that it increases (e.g. parabolically) from the circumference to the center of the core. This will cause the light to travel a sinusoidal path, with the speed of the light increasing toward the periphery where the index is lower. Hence, light traveling the longer peripheral paths will travel at higher speeds thereby compensating for the added distance and decreasing the dispersion of the input pulse.

The causes for loss in a fiber are material absorption, material scattering, cladding loss and geometry loss. Material absorption losses occur because of transition metal ions and OH groups in the glass that absorb light [e.g. 1 part per million iron will result in a loss of 100 db per km at 800 nm (nanometers)]. Material scattering is due to imperfections in the fiber core, primarily bubbles, microcracks and debris. Cladding loss exists because of imperfections at the core-cladding interface. Geometry loss is due to bends in the fiber and is an inverse function of numerical aperture. A low loss fiber should have losses no greater than 150 db per km.

Typically, the cladding material of an optical fiber is fused silica ($SiO_2$) of high purity although other glasses such as borosilicates are also used. The core may be a silica glass to which modifiers are added to increase the index of refraction (and the numerical aperture). Suitable modifiers for this purpose include lead oxide (PbO), barium oxide (BaO) and germanium dioxide ($GeO_2$). These modifiers, in turn, may cause problems of glass stability, and agents such as calcium, zinc, or alumina may be added as stabilizing agents. To facilitate melting of the glass (for drawing), fluxing agents such as the oxides of the alkali metals (potassium, sodium and lithium) may also be added.

The introduction of these various agents or components into the core glass creates problems insofar as contamination and, therefore, material absorption losses are concerned. The various components themselves may be sources of contaminants but, equally important, the procedure by which a multi-component glass is made can add contaminants which cause substantial material absorption losses.

THE PRIOR ART

Various techniques are used to make optical fibers. The most important processes for making low loss fiber optics are known as the double crucible process, the chemical vapor deposition process and the ion leaching process. Each of these has significant limitations.

British Pat. No. 1,340,849 (Uffen) discloses a process for manufacturing optical fibers wherein a tube of cladding material serves as a crucible in which the core glass is melted. The batch for the core glass is premixed and introduced into the tube in a powder form, with particle sizes chosen "so that when a fine rain of the powder mixture falls on the surface of the hot melt volatile products may be uninterruptedly evolved . . . ". This reduces the fining period. Uffen states that the surface of the melt and the falling particles may be heated by auxiliary heating means to assist "in the provision of appropriate conditions" (page 2, lines 28–32).

The Uffen process has the basic advantage of retaining purity (enhancing efficiency) and of enabling control of numerical aperture. Moreover, it is not limited as to perform size and, consequently, is capable of large scale production. As such, this process has important advantages over other fiber manufacturing processes including the double crucible process, the chemical vapor deposition process, and the ion leaching process.

OBJECT OF THE INVENTION

An object of this invention is to provide an improved process for making low loss, high numerical aperture optical fibers.

Another object of the invention is to provide a core glass composition of particular utility in an optical fiber manufacturing process wherein the core glass is melted and fined within a tube made of the cladding material.

A more specific object of the invention is to provide a core glass composition having a relatively high index of refraction, which is fast melting and stable at high temperature.

DESCRIPTION OF THE DRAWING

The drawing shows diagrammatically the apparatus and materials used to practice the invention.

SUMMARY OF THE INVENTION

In accordance with the invention, the batch material from which the core glass is to be made is inserted into a closed tube made of the cladding material and melted to form a glassy liquid within the tube. The core glass includes silicon dioxide, an alkali oxide, boron oxide, and either lead oxide or barium oxide. The batch material is introduced in the form of a powder and may be melted as it is introduced to form a glassy liquid in the bottom of the closed tube. Fining takes place in the glass tube and the tube and core glass are then elevated to drawing temperature and drawn into the optical fiber.

DETAILED DESCRIPTION

As used herein, the term "batch material" means an ingredient used to form glass. In most cases these ingredients (or glass components) are oxides which are mechanically mixed and melted. Upon cooling, the glass is formed. Commonly, these ingredients are referred to as glass formers, glass modifiers and fluxes. In some cases, a batch material may be pre-reacted, for example, by heating to facilitate outgassing. Glass may include one or several of these components depending on the properties desired. In the case of optical fibers, the principal properties of concern (besides purity) are index of refraction, viscosity, thermal expansion and stability.

To manufacture commercial quantities of fiber, in addition to the characteristics described, the core glass must be rapidly formed. For example, if drawing is to take place at a rate of one meter per second (or faster), the batch material must be fined (i.e. made bubble free) in the silica tube within about one hour or less. During fining, the glass melt must not attack the wall of the silica tube or, if it does, the attack must be uniform. Otherwise, discontinuities may be formed which will cause reflection of light and, consequently, increased losses. The core glass also must be stable at the high temperature (e.g. 1800° C. to 2000° C.) at which drawing takes place. Instability is manifested as foaming which will generally cause the tube of cladding material to rupture.

In accordance with the invention, the core glass which is melted in the silica tube comprises silicon dioxide and index modifiers such as boron oxide and barium oxide or lead oxide (or both). An alkali oxide is also included as a fluxing agent. Preferably, the silica is present in an amount between 27% and 42% by weight; the alkali oxide is selected from the group consisting of lithium oxide, sodium oxide and potassium oxide and is present in an amount between 5% and 30% by weight; the boron oxide is present in an amount between 7% and 50% by weight; and the barium oxide and/or lead oxide is present in an amount between 5% and 51% by weight. Zinc oxide (up to 10% by weight) and/or aluminum oxide (up to 10% by weight) may be included as stabilizing agents, and arsenic oxide (up to 2% by weight) may be included as a fining agent.

As mentioned above, the glass compositions selected in accordance with the invention are intended for use in a fiber manufacturing process in which the core glass is actually melted and fined within the cladding material. This basic process is disclosed in Uffen British Pat. No. 1,340,849 and in parent application Ser. No. 898,840. An improved version of this basic process is described below with reference to the drawing.

A commercially available, high purity, fused silica tube 10 is closed at one end and a second tube 12, also of silica, inserted into the tube 10 so that the bottom of tube 12 is slightly above the closed end of tube 10. The inner tube 12 includes an opening 16 through which the batch material for the core glass can be introduced.

Three heating elements 18, 20 and 22 envelope the tube 10. Although any suitable heating means may be used, the heaters may comprise graphite resistance heating devices enveloping tube 10 with insulation 23 separating elements 18 and 20. The upper heater 18 provides a conditioning zone in which the batch material may be heated prior to melting or actually melted as described in further detail below. The heater 20 provides a higher temperature melting zone in which, according to the invention, the cladding material and core glass react. The lowermost heater 22 is capable of raising the temperature of the glass to drawing temperatures so that the fiber can be drawn.

The batch material can (and should) be of high purity and substantially less refractory than the tube 10 so that tube 10 can serve as a crucible in which the batch material can be melted. In the drawing the batch material is represented by the particles 25. The batch material is introduced through opening 16 in the form of premixed powder and falls through the inner tube 12 to the bottom of the cladding tube 10 where it ultimately forms a glassy liquid 24. A seal 26 (e.g. a heat resistant Teflon ring) is provided between the inner tube 12 and the cladding material 10 at the top of the tube 10. A partial vacuum (e.g. 10 mm of Hg) is applied to a port 27 between tubes 10 and 12 to draw off effluent gasses formed as the batch materials is conditioned and subsequently melted. The prompt outgassing of these undesired effluents is important in a continuous process since it avoids the production of fine bubbles ("seed") which may require prolonged fining. (See page 2, lines 28–33 of British Pat. No. 1,340,849). A pair of O-rings 28 (which also may be made of Teflon) provide a movable seal enabling the partial vacuum to be maintained as the glass tube 10 is lowered during drawing of the fiber.

In accordance with a preferred feature of the invention the incoming batch material is melted before it reaches the glassy liquid 24 at the bottom of tube 10. For this purpose, the upper heating zone should maintain a temperature in excess of 1600° C. The batch is in the form of powder particles (e.g. 50 to 100 microns) which are thoroughly mixed and allowed to agglomerate so as to form molten glass droplet as they fall through the tube. These droplets have a very high surface to volume ratio so that gaseous effluents formed during melting escape easily. This increases melting speed and also shortens the fining period required to rid the glassy liquid of entrapped bubbles.

Furthermore, by melting the batch material in air rather than in the glassy liquid 24, corrosive products of fusion which would otherwise attack silica tube 10 are evacuated as the batch material is added. This reduction in (non-uniform) corrosion of the cladding wall means that lower losses are obtainable.

The inner tube 12 prevents splattering of the melted glass against the inner wall of the cladding tube 10. The position of the tube 12 relative to the glassy liquid 24 should remain the same. Thus, if the tube 12 is maintained stationary, the outer tube 10 (and seal 26) must be moved downwardly as the fiber is drawn. Preferably, the bottom of the tube 12 should be about 10 mm above the surface of the glassy liquid 24. If it is too high, batch particles may be sucked out by the vacuum; if too close, the melt may freeze and plug the bottom of the tube 12.

The inner tube 12 also maintains the downward trajectory of the molten drops constant despite relative movement of the cladding tube 10. In other words, each droplet falls the same distance (e.g. about 3 or 4 feet) and undergoes the same heat cycle as all other droplets. This is important when the glass is being melted in air since it ensures the same degree of melting for each droplet before it reaches the bottom of tube 10.

Typically, the glass melt 24 may be about 30 mm deep. If too much liquid is allowed to accumulate, a crust may form which will prevent outgassing and possibly cause tube 10 to explode. If there is an inadequate supply of the glassy liquid 24, the liquid may be consumed totally during a rapid drawing process.

Various different core glasses have been used to make optical fibers in accordance with the invention. Examples of successfully used core glass compositions are given below, with percentages specified by weight. In the following examples, a high-purity fused silica outer tube 10 having an inner diameter of 19 mm and an outer diameter of 25 mm was used. Tube 12 was also fused silica with an inner diameter of 7 mm and an outer diameter of 10 mm. Fused silica is one of the purest materials available in terms of transition metal ions (primarily iron, copper and cobalt).

In the following examples, the batch material was heated to a temperature of about 1500° C. in the top zone. The glassy liquid 24 was maintained at a temperature of about 1750° C.–1900° C. for about one hour with the surface of the melt maintained at a temperature about 100° C. lower to avoid so-called metal line cut at the surface of the melt. About 1 mm of the tube 10 was at least partially mixed with the core glass. The fiber was drawn at a rate of about 0.5 M/sec. at a temperature of about 1950° C.

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 27 | 27 | 27 | 27 | 27 | 27 | 27 | 27 | 27 | 27 | 27 | 27 |
| BaO | 51 | 51 | 46 | 41 | 36 | 31 | 51 | 46 | 41 | 36 | 40 | 30 |
| $K_2O$ | — | 5 | 5 | 5 | 5 | 5 | 5 | 5 | 5 | 5 | — | — |
| $Na_2O$ | — | — | — | — | — | — | — | — | — | — | 15 | 19 |
| $Li_2O$ | — | — | — | — | — | — | — | — | — | — | — | — |
| $B_2O_3$ | 17 | 15 | 12 | 12 | 12 | 12 | 7 | 7 | 7 | 7 | 22 | 27 |
| ZnO | — | — | — | — | — | — | 5 | 5 | 5 | 5 | — | — |
| $Al_2O_3$ | 5 | 2 | 5 | 5 | 5 | 5 | 5 | 5 | 5 | 5 | — | — |
| PbO | — | — | 5 | 10 | 15 | 20 | — | 5 | 10 | 15 | — | — |
| $As_2O_3$ | — | — | — | — | — | — | — | — | — | — | 1 | 1 |
| Index | 1.608 | 1.610 | 1.621 | 1.620 | 1.613 | 1.632 | 1.624 | 1.628 | 1.636 | 1.640 | 1.596 | 1.576 |
| Softening Point | 743 | 684 | 700 | 692 | 677 | 668 | 725 | 704 | 699 | 681 | 637 | 596 |
| NA* | 0.68 | 0.68 | 0.71 | 0.70 | 0.70 | 0.73 | 0.71 | 0.72 | 0.74 | 0.75 | 0.64 | 0.59 |

|  | 13 | 14 | 15 | 16 | 17 | 18 | 19 | 20 | 21 | 22 | 23 | 24 |
|---|---|---|---|---|---|---|---|---|---|---|---|---|
| $SiO_2$ | 42 | 42 | 42 | 37 | 27 | 42 | 42 | 40 | 38 | 36 | 27 | 27 |
| BaO | 15 | 5 | 10 | 5 | 15 | 5 | 10 | 5 | 10 | 15 | 13 | 11 |
| $K_2O$ | — | — | — | — | — | — | — | — | — | — | — | — |
| $Na_2O$ | 22 | 17 | 12 | 22 | 22 | 22 | 22 | 21 | 20 | 19 | 22 | 22 |
| $Li_2O$ | — | — | — | — | — | — | — | — | — | — | — | — |
| $B_2O_3$ | 20 | 35 | 35 | 35 | 35 | 30 | 25 | 33 | 31 | 29 | 35 | 35 |
| ZnO | — | — | — | — | — | — | — | — | — | — | — | — |
| $Al_2O_3$ | — | — | — | — | — | — | — | — | — | — | — | — |
| PbO | — | — | — | — | — | — | — | — | — | — | — | — |
| $As_2O_3$ | 1 | 1 | 1 | 1 | 1 | 1 | 1 | 1 | 1 | 1 | 1 | 1 |
| Index | 1.540 | 1.528 | 1.530 | 1.532 | 1.548 | 1.536 | 1.540 | 1.536 | 1.544 | 1.551 | 1.551 | 1.552 |
| Softening Point | 599 | 652 | 656 | 621 | 582 | 628 | 623 | 630 | 630 | 624 | 501 | 577 |
| NA* | 0.49 | 0.45 | 0.46 | 0.47 | 0.52 | 0.48 | 0.49 | 0.48 | 0.50 | 0.53 | 0.53 | 0.53 |

|  | 25 | 26 | 27 | 28 | 29 | 30 | 31 | 32 | 33 | 34 | 35 | 36 |
|---|---|---|---|---|---|---|---|---|---|---|---|---|
| $SiO_2$ | 27 | 27 | 35 | 30 | 27 | 27 | 36 | 27 | 27 | 27 | 27 | 27 |
| BaO | 9 | 7 | 5 | 10 | 18 | 18 | — | — | 18 | — | 18 | — |
| $K_2O$ | — | — | — | — | — | — | — | — | — | — | — | — |
| $Na_2O$ | 22 | 22 | 25 | 25 | 17 | 22 | 19 | 22 | 25 | 25 | 15 | 15 |
| $Li_2O$ | — | — | — | — | — | — | — | — | — | — | 10 | 10 |
| $B_2O_3$ | 35 | 35 | 34 | 34 | 35 | 30 | 29 | 35 | 29 | 29 | 29 | 29 |
| ZnO | — | — | — | — | — | — | — | — | — | — | — | — |
| $Al_2O_3$ | — | — | — | — | — | — | — | — | — | — | — | — |
| PbO | — | — | — | — | 2 | 2 | 15 | 15 | — | 18 | — | 18 |
| $As_2O_3$ | 1 | 1 | 1 | 1 | 1 | 1 | 1 | 1 | 1 | 1 | 1 | 1 |
| Index | 1.553 | 1.554 | 1.535 | 1.544 | 1.556 | 1.555 | 1.559 | 1.557 | 1.548 | 1.564 | 1.568 | 1.578 |
| Softening Point | 582 | 569 | 595 | 580 | 607 | 555 | 594 | 564 |  |  |  |  |
| NA* | 0.53 | 0.53 | 0.48 | 0.53 | 0.54 | 0.54 | 0.55 | 0.54 | 0.52 | 0.56 | 0.57 | 0.60 |

*With Silica Cladding

The foregoing examples show that the invention is capable of producing low loss fibers with numerical aperture greater than 0.4 (i.e. for silica cladding, the index of refraction of the core glass is greater than about 1.5). This is important for commercial purposes but has proven difficult, if not impossible, to obtain with known processes for producing low loss fibers.

The following Table indicates the raw batch materials used to furnish the various oxides set forth in Examples 1–36. The righthand column contains a brief statement of the function served by the corresponding oxide in the glass.

| Oxide Component | Batch Material | Scale Factor* | Function |
|---|---|---|---|
| $SiO_2$ | $SiO_2$ | 1.0 | Glass former needed for basic structure. |
| $B_2O_3$ | $B_2O_3$ | 1.0 | Glass former needed for basic structure. Makes glass easier to melt. Borosilicate structure shows lower loss with the same level of contamination. |
| BaO | $BaCO_3$ | 1.29 | Raises index of refraction; makes glass easier to melt; promotes silica crucible attack. |
| PbO | $Pb_3O_4$ | 1.02 | |
| ZnO | ZnO | 1.0 | Glass stabilizers |
| $Al_2O_3$ | $Al_2O_3$ | 1.0 | |
| $Li_2O$ | $Li_2CO_3$ | 2.47 | Makes glass easier to meet; promotes silica attack. |
| $Na_2O$ | $Na_2CO_3$ | 1.71 | |
| $K_2O$ | $K_2CO_3$ | 1.47 | |
| $As_2O_3$ | $As_2O_3$ | 1.0 | Fining agent |

*Number that must be multiplied by Batch Material (weight %) to give Oxide (weight %).

What is claimed is:

1. A process for making a low loss optical fiber having a numerical aperture in excess of about 0.4 and comprising a multi-component glass core within a cladding material, including the steps of:

melting a glass core composition with a tube made of a high-purity fused silica, said core glass composition comprising by weight 27% to 42% silicon dioxide, 7% to 50% boron oxide, 5% to 51% of an oxide selected from the group consisting of lead oxide and barium oxide, and 5% to 30% of an alkali oxide selected from the group consisting of lithium oxide, sodium oxide and potassium oxide;

fining the melted core glass within said glass tube at a temperature substantially in excess of the melting temperature of said glass core composition to enable uniform mixing of said core glass and silica; and drawing said tube and core glass into said optical fiber.

2. A method of making a low loss optical fiber according to claim 1, wherein said glass core composition also includes an alkaline earth oxide in an amount up to about 10% by weight.

3. A method of making a low loss optical fiber according to claims 1 or 2, wherein said glass core composition also includes aluminum oxide in an amount up to about 10% by weight.

4. A method of making a low loss optical fiber according to claim 1, wherein said barium oxide is present in an amount from 0% to 51% by weight and said lead oxide is present in an amount from 0% to 25% by weight.

5. A method of making a low loss optical fiber according to any of claims 1, 2 and 4, wherein said glass core composition further includes arsenic oxide in an amount up to 2% by weight.

* * * * *